April 26, 1966 J. C. FROMMER 3,248,551
OPTICAL ARRANGEMENT FOR SENSING VERY SMALL PARTICLES
Filed Oct. 22, 1962 2 Sheets-Sheet 1

INVENTOR:
Joseph C. Frommer

April 26, 1966   J. C. FROMMER   3,248,551
OPTICAL ARRANGEMENT FOR SENSING VERY SMALL PARTICLES
Filed Oct. 22, 1962   2 Sheets-Sheet 2

INVENTOR:
Joseph C. Frommer

United States Patent Office 3,248,551
Patented Apr. 26, 1966

3,248,551
OPTICAL ARRANGEMENT FOR SENSING
VERY SMALL PARTICLES
Joseph C. Frommer, 1525 Teakwood Ave.,
Cincinnati, Ohio
Filed Oct. 22, 1962, Ser. No. 232,116
6 Claims. (Cl. 250—218)

Figure 1:
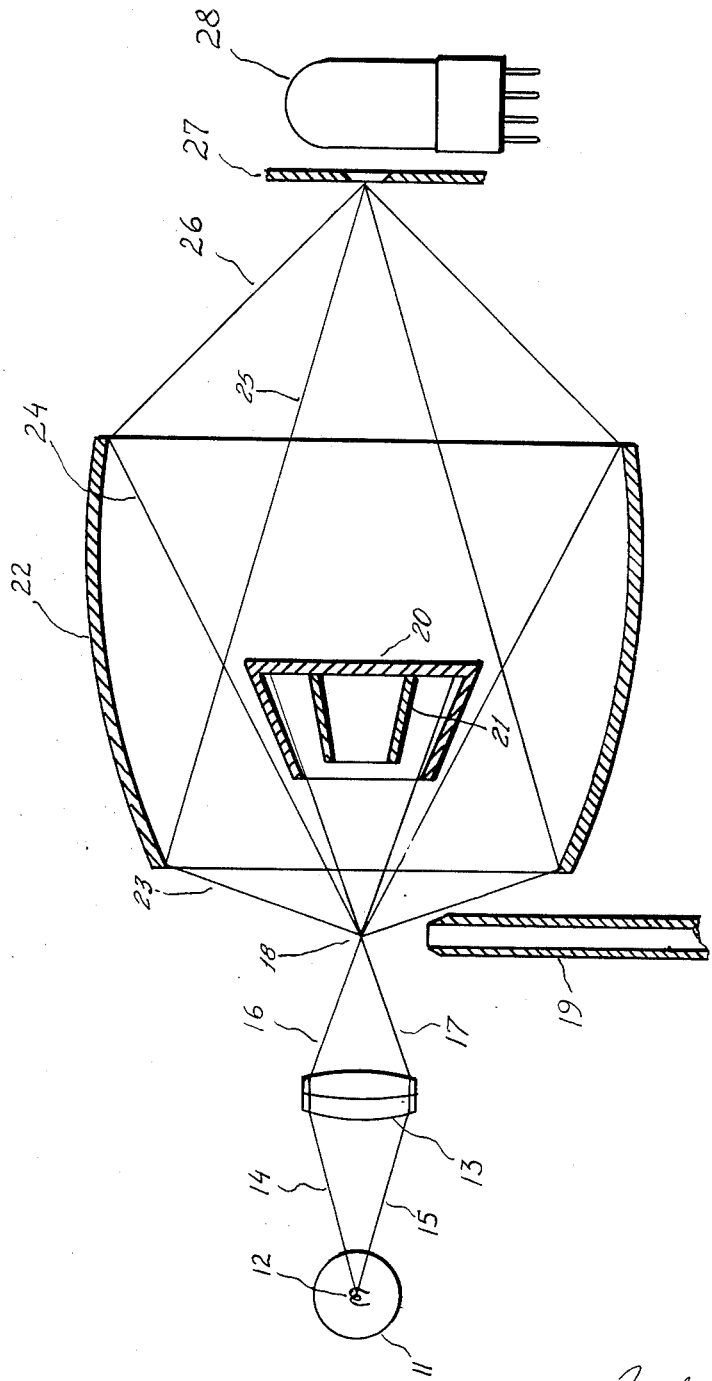

This invention relates to the sensing of small particles in fluids, as bacteria in liquids or gases, dust, pollen or aerosols in air and so forth, more particularly to their sensing by means of electromagnetic radiations, inside or outside the visible spectrum, that these particles may deflect toward photosensors, preferably photomultiplier tubes. Photoelectric sensing of small particles is done at present in the following way: Light is concentrated onto the fluid in which the particles are to be sensed. A photosensor is so located that it picks up light that leaves the illuminated area in a direction different from the direction of impact of this light. If a particle appears in this illuminated area, which may be called "inspection zone," then it will divert part of the light falling on it into the direction in which the photosensor picks up radiations. This radiation will cause the photosensor to give a corresponding signal. This principle is illustrated in FIG. 1 of U.S. Patent No. 2,775,159, in FIGS. 1, 3 and others of U.S. Patent No. 3,045,123 and in many other places.

As we try to sense smaller and smaller particles, the amount of light deflected by a particles gets less and less and detection gets harder and harder. Widening the aperture under which the fluid is illuminated or inspected runs into a number of difficulties. One is that producing objective lenses with unusually large f/numbers is expensive and has serious engineering limitations. Another is that as we increase this aperture, the angle between illumination and inspection for various combinations of illuminating rays and inspection rays varies more and more. This angle has quite some significance, because at small values of this angle the unwanted stray signals to the photosensor increase unduly, whilst at large values of this angle very small particles reflect a very small amount of light only.

Now if we study the optical arrangement of the present art, we notice that we could place quite a number of inspecting objective lenses around the inspection zone, all at the same angular position with respect to the illuminating objective lens, only with their optical axes in planes going through the optical axis of the illuminating objective in various directions. A separate photosensor may be situated behind each of these inspecting objectives. The sum of the signals delivered by all of these photosensors or simultaneous appearance of a signal in all of these photosensors would then provide an improved information on the presence of a particle in the inspection zone. Inversely, a single photosensor could pick up the light deflected from an inspection zone illuminated with a number of lamp-objective combinations from directions identical as to angle between optical axis of illumination and inspection, but with the optical axes of the illuminating systems positioned in different planes going through the axis of inspection.

Whereas either of these systems is feasible and would increase the optical efficiency, they would be bulky and expensive. According to the present invention, such a ring of optical systems is replaced by a single annular reflecting surface which picks up all the light deflected by the particles in the desired direction or which illuminates the inspection zone from all sides within the desired angular limits. The geometrical surface which reflects all light from one point toward another point is the ellipsoid which reflects the light from one of its focal points toward its other focal point. Light from neighboring points is directed toward areas around that second focal point. Therefore the reflecting surface suitable for the present invention is a segment of an ellipsoid with one of its focal points in the inspection zone and with the other of its focal points at the point of light admission to the photosensor which may be a mask, some other limitation of illumination or the light sensitive surface of the photosensor itself. Technological reasons of production or tracting of the rays emanating from points outside the focal point may indicate certain deviations from this geometrical shape.

The following numerical example will show the advantage of the invention. In a system according to present art the inspection zone may be illuminated by an objective the extreme rays of which are 20° off the central ray. The inspecting objective may be similar and it may have its optical axis at 125° with respect to the optical axis of the illumination. This objective will then accept rays deflected between 105° and 145° from the direction of the optical axis of illumination. The solid angle covered by this objective will be $(1-\cos 20°) \times 2\pi$ stearadians $= .06 \times 2\pi$ stearadians. It now, according to the invention, we provide an annular reflecting surface extending from the viewing angle of 105° to the viewing angle of 145°, then this annular reflector will see the inspection zone under a solid angle of $(\cos 145° - \cos 105°) \times 2\pi$ stearadians. $\cos 145° - \cos 105° = .829 - .259 = .57$. Accordingly this ellipsoid reflector will pick up $.57/.06 = 9.5$ times more radiation than the objective lens.

This almost tenfold gain may be utilized in different ways. It may be used simply to sense particles drowned at present under the background noise, but it may also be utilized to take advantage of the additional information on particle size, material or shape available from knowledge of the angular distribution of the deflected light. For this purpose, a number of annular rings covering various angular regions of reflection can be provided which would throw the light deflected toward them onto different photosensors.

An added advantage of using reflecting surfaces instead of lenses is that they can be readily used with ultraviolet light which is more suitable to detect very small particles than visible light. Another advantage of the invention is that circular inspection or circular illumination reduces the variations occurring from particles of irregular shape passing the inspection zone in various angular positions.

It is an object of the invention to provide an improved optical system for sensing small particles.

Another object of the invention is to provide separate information on reflection by particles into various directions with respect to their illumination.

Another object of the invention is to provide an optical system less dependent on the orientation of particles during their passage through the inspection zone of the detecting system.

Another object of the invention is to provide an optical system usable over a wide spectrum of visible and invisible light.

Figure 2:
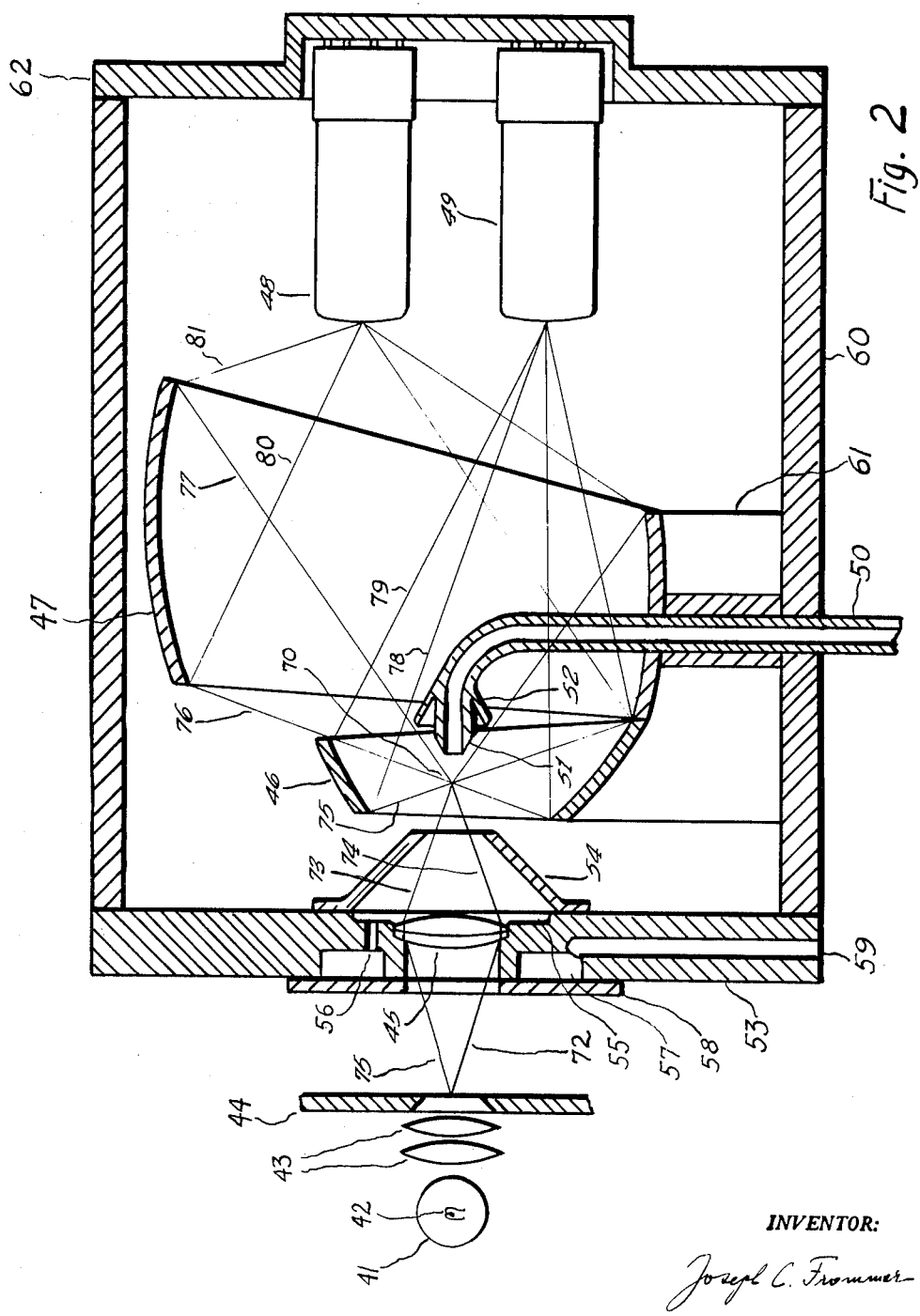

Other objects and advantages of the invention may be found in connection with the description of the drawings of which:

FIG. 1 shows a schematic diagram of the optical system of a dust particle detector according to the invention FIG. 2 shows another such diagram with two annular reflecting surfaces deflecting light onto two photosensors.

In FIG. 1, 11 denotes a lamp having a filament 12. 13 is a lens which projects an image of filament 12 into the inspection zone 18. The utilized cone of light is limited by rays 14, 15 before the lens 13 and by rays 16, 17 after this lens. These rays, as well as all rays within their confines are trapped in the light trap 20, consisting of a black container open toward the incident light and having a conical segment 21 to trap such light as the bottom or wall of the container still reflects.

Pipe 19 blows the air to be inspected toward the inspection zone 18. Whenever a dust particle appears in this inspection zone, it will deflect some light within the conical configuration originating by rotation of lines 23, 24 around the optical axis of illumination. The mirror 22 has an ellipsoid shape originating by rotating, around the axis of illumination, an ellipse with one of its focal points at the center of the inspection zone, its other focus at the center of mask 27. Behind mask 27 is situated photomultiplier tube 28. On the cathode of this photomultiplier tube will be gathered light deflected by dust particles in all directions within the cones generated by lines 23, 24.

In FIG. 2, 41 denotes a lamp having a filament 42. 43 denotes simple double convex lenses, 44 a mask. 45 is an objective lens, 46, 47 are annular reflectors. 48, 49 are photomultipliers with head-on semi-transparent cathodes. 50 is an inlet pipe with a conical exit-nozzle 51 and a light trap 52 surrounding it. 53 is a plate holding the objective 45 and a light-trap 54. Between this objective and this light trap is situated a circular canal 55 with holes 56 connecting it to the circular canal 57. This second canal is covered by cover plate 58 and connects into hole 59. 60 is a cylindrical cover surrounding the entire system, 61 is a web holding reflectors 46, 47 and is reinforced around pipe 50. 62 is a cover plate accommodating the photomultiplier tubes 48, 49; 70 denotes the position of the inspection zone, 71 through 81 denote various rays of illumination and reflection.

Lenses 43 project the filament 42 onto the objective lens 45. This objective lens images the mask 44 into the inspection zone 70 with limiting rays 71, 72 before the objective and limiting rays 73, 74 after the objective. Rays passing through the inspection zone undeflected will be traped by the light-trap 52. Rays impinging on particles in the inspection zone will be deflected. Rays deflected into the directions within the cones formed by rotation of lines 75, 76 around the axis of illumination will reach the annular reflecting surface 46 and will be directed by it toward its second focal point at the center of the cathode surface of multiplier 49. Rays falling within the conical surfaces formed by rotating lines 76, 77 will fall onto the annular reflector 47 and will be reflected by it toward its second focal point situated at the center of photomultiplier cathode 48. In this way photomultiplier 48 will obtain reflection at around 135° and photomultiplier 49 will obtain reflection at around 90° with respect to the illumination of the particles.

Air is sucked through hole 59 by a blower, not shown. Since the whole system is closed, this suction forces air to enter through the inlet pipe 50 in which the air will be directed into a straight stream flowing through the inspection zone coaxially with the illuminating optics.

The annular reflecting surfaces shown in the drawings may be front surface mirrors, but they may also be rear surface mirrors and utilization or compensation of the dioptric properties of the transparent material between the front and rear surface of such rear surface mirrors would not be outside the scope of the invention. The embodiment shown in FIG. 2 may be refined by using more than two annular reflectors with their first focal point in the inspection zone and with their second focal point on the centers of phototubes situated in a circular pattern around the axis of illumination. In FIG. 1 the lamp 11 could be placed in place of the mask 27 and the phototube-mask combination could be placed in place of lamp 11 providing inspection through conventional means, such as illustrated in FIG. 1 of U.S. Patent No. 2,775,159, but illumination from an annular reflector.

From the foregoing description of what presently appears to be a preferred embodiment of the invention, it will be apparent to those having ordinary skill in the art to which this invention pertains, various modifications and changes may be made in the illustrative embodiment without departing from the spirit or scope of the appended claims.

Therefore, what is claimed as new, and is desired to be secured by letters patent, is:

1. In a system to sense the presence of small particles in a fluid, the combination comprising walls to exclude outside light, a source of illumination, at least one photosensor sensitive to light reaching it through an area of admission of light, first means directing illumination from said source of illumination toward an inspection zone inside said fluid, second means directing light deflected by particles in said inspection zone toward said area of admission of light to said photosensor, said photosensor being so arranged as not to be reached by light not deflected by said particles, the improvement of including in at least one of said means at least one annular reflecting surface so shaped that it directs light from a first focal zone toward a second focal zone, one of said focal zones being at said inspection zone.

2. In a system according to claim 1, said annular reflecting surface being a segment of an ellipsoid mirror.

3. In a system according to claim 1, said annular reflecting means being arranged with said first focal zone at said inspection zone and with said second focal zone at said area of admission of light of said photosensor.

4. In a system according to claim 1, said annular reflecting means being arranged with said first focal zone at said source of illumination and with said second focal zone at said inspection zone.

5. In a system according to claim 1, said first means illuminating said inspection zone with a cone of light having an optical axis and said annular reflecting surface being arranged around said optical axis to extend between two cones concentric to said optical axis with said first focal zone of said annular reflecting surface at said inspection zone and with said second focal zone of said annular reflecting surface at said area of admission of light of said photosensor.

6. In a system to sense the presence of particles inside a fluid, the combination comprising means to provide a stream of said fluid to move through an inspection zone, a light source, at least one photosensor, optical means directing light from said light source toward said inspection zone in a cone of light having an optical axis, an annular reflecting surface arranged concentrically with said optical axis outside said cone of light and so shaped that it intercepts light defleced from said cone of light by particles inside said fluid in said inspection zone and directs said intercepted light towards photosensor, and a light trap intercepting the undeflected light of said cone of light after it has passed through said inspection zone.

References Cited by the Examiner

UNITED STATES PATENTS

| | | | |
|---|---|---|---|
| 1,897,219 | 2/1933 | Schroter | 250—228 X |
| 2,654,242 | 10/1953 | Falgatter et al. | 88—14 |
| 2,938,423 | 5/1960 | Rich | 88—14 |
| 2,944,156 | 7/1960 | Davy et al. | 250—216 X |
| 2,967,935 | 1/1961 | Cook | 250—216 X |
| 2,984,747 | 5/1961 | Walker | 250—228 X |
| 3,141,094 | 7/1964 | Strickler | 250—218 |

RALPH G. NILSON, *Primary Examiner.*

WALTER STOLWEIN, *Assistant Examiner.*